United States Patent
Esclusa et al.

(10) Patent No.: US 11,769,167 B1
(45) Date of Patent: Sep. 26, 2023

(54) SYSTEMS AND METHODS FOR CUSTOMIZING THE RETAIL SHOPPING EXPERIENCE ON AN INDIVIDUALIZED BASIS

(71) Applicant: BAMBUMETA, LLC, New York, NY (US)

(72) Inventors: William Esclusa, Rosweel, GA (US); Patrick James Faiola, Nashua, NH (US); Fabio Morato, Santo Agostinho (BR)

(73) Assignee: BAMBUMETA, LLC, New York, NY (US)

( * ) Notice: Subject to any disclaimer, the term of this patent is extended or adjusted under 35 U.S.C. 154(b) by 0 days.

(21) Appl. No.: 18/059,029

(22) Filed: Nov. 28, 2022

(51) Int. Cl.
*G06Q 30/02* (2023.01)
*G06Q 30/0207* (2023.01)
*G06Q 20/38* (2012.01)
*G06Q 30/0201* (2023.01)

(52) U.S. Cl.
CPC ....... *G06Q 30/0224* (2013.01); *G06Q 20/387* (2013.01); *G06Q 30/0206* (2013.01); *G06Q 2220/00* (2013.01)

(58) Field of Classification Search
CPC ............. G06Q 30/0224; G06Q 20/387; G06Q 30/0206; G06Q 2220/00
See application file for complete search history.

(56) References Cited

U.S. PATENT DOCUMENTS

| | | | |
|---|---|---|---|
| 9,256,890 B1* | 2/2016 | Schmidt | G06Q 30/0639 |
| 11,263,656 B1* | 3/2022 | Weiss | H04L 9/50 |
| 11,544,760 B1* | 1/2023 | Ware | G06V 10/25 |
| 2011/0251879 A1* | 10/2011 | Lambert | G06Q 30/0224 |
| | | | 705/14.1 |
| 2012/0253907 A1* | 10/2012 | Ouimet | G06Q 30/02 |
| | | | 705/26.8 |
| 2016/0335655 A1* | 11/2016 | Hansen | G06Q 30/0233 |
| 2017/0364936 A1* | 12/2017 | Balfour | G06Q 20/204 |
| 2018/0150865 A1* | 5/2018 | Arora | G06Q 30/0225 |

(Continued)

OTHER PUBLICATIONS

"Enterprise Blockchain for digital coupons" (Pereverzyev, Alex et al.—published online on before May 28, 2022 as retrieved using the Internet Archive WaybackMachine on Feb. 14, 2023) (Year: 2022).*

*Primary Examiner* — James M Detweiler
(74) *Attorney, Agent, or Firm* — Ansari Katiraei LLP; Arman Katiraei; Sadiq Ansari

(57) ABSTRACT

Disclosed is a dynamic price orchestration platform ("DPOP") that creates dynamic item pricing for different users based on user profile data that is specific to each user, and pricing rules that specify different formulas and use different user profile data for the custom price computation for each item. The DPOP receives a request with an item identifier with a device identifier, obtains a user profile that is associated with the device identifier and that contains the user-specific data, and selects a pricing rule defined for the item identifier. The DPOP generates a dynamic price at which the particular item is offered to the user associated with the device identified by the device identifier based on the user profile data specified in pricing rule being provided as input to the pricing rule. The DPOP then adjusts the particular item price at a point-of-sale to the dynamic price.

15 Claims, 8 Drawing Sheets

(56) References Cited

U.S. PATENT DOCUMENTS

| | | | | |
|---|---|---|---|---|
| 2018/0253745 A1* | 9/2018 | Webster | ............. | G06Q 20/3674 |
| 2018/0300518 A1* | 10/2018 | Burkhart | .......... | G06K 19/06037 |
| 2019/0012695 A1* | 1/2019 | Bishnoi | ................ | G06Q 20/223 |
| 2021/0056580 A1* | 2/2021 | Walker | ............... | G06Q 30/0222 |
| 2022/0391938 A1* | 12/2022 | Sridhar | .................. | G06N 20/00 |

* cited by examiner

SYSTEMS AND METHODS FOR CUSTOMIZING THE RETAIL SHOPPING EXPERIENCE ON AN INDIVIDUALIZED BASIS

BACKGROUND

Coupons incentivize customers to purchase items of a certain brand or from a particular store. However, once a coupon is released to the public, usage of that coupon becomes difficult to control. A simple web query may identify any and all coupons that are applicable to certain brands or stores, and may steer users to stores without the users visiting the stores or having knowledge of the store inventory. In other words, the coupons steer users to stores primarily on discounts that the stores offer with the relevance or desirability of the goods to the users becoming a secondary consideration.

Appealing to the individualized interests and/or preferences of users is difficult with generic coupons (e.g., "10% off purchases over $50") that anyone can use or that apply to all items of a specific brand. In other words, generic coupons do not specifically target the customer's interests or preferences. As such, generic coupons are more effective at luring bargain hunters than incentivizing existing customers to return in order to address individualized interests and/or preferences.

DETAILED DESCRIPTION OF PREFERRED EMBODIMENTS

Figure 1:
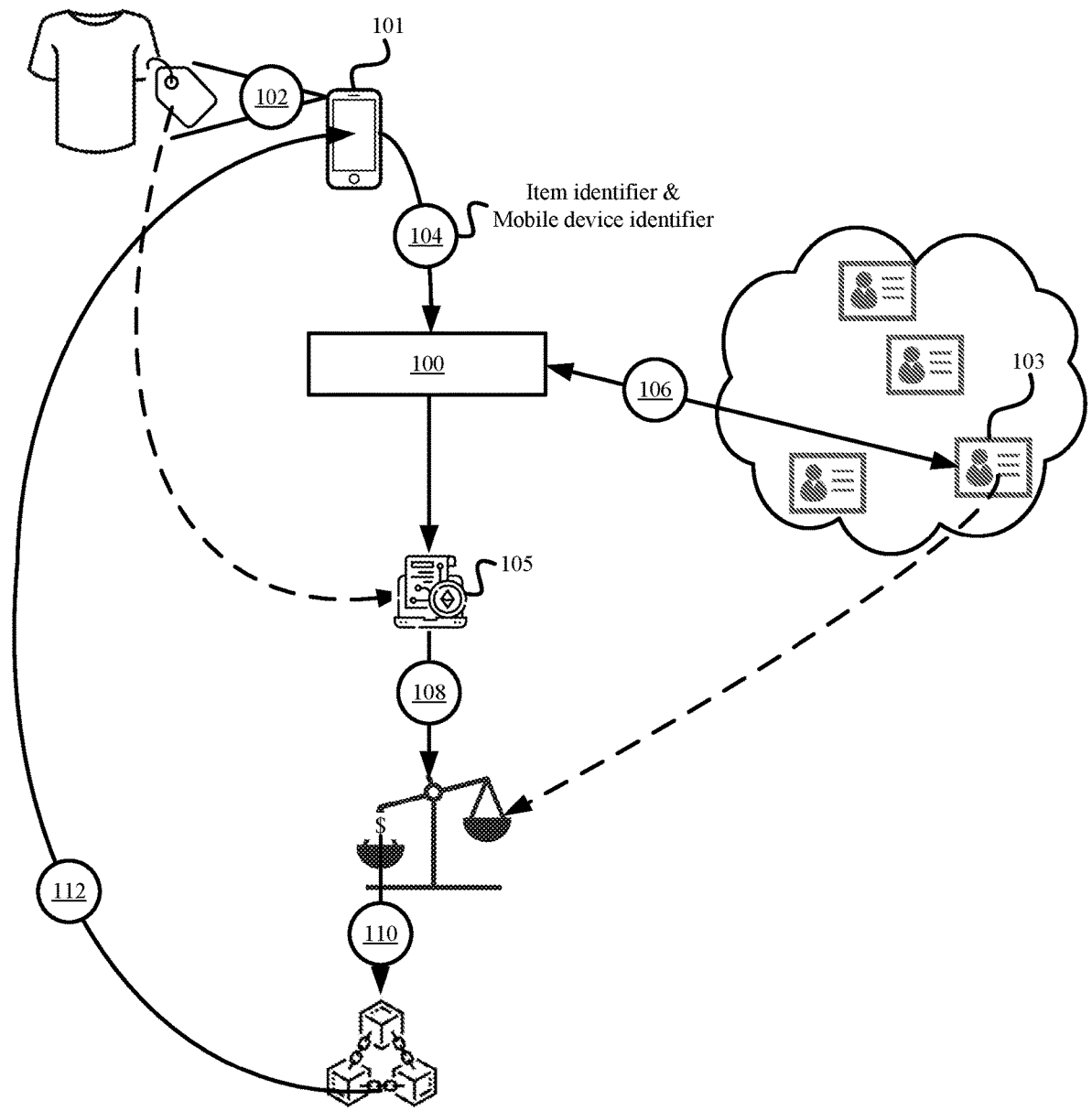
FIG. 1 illustrates an example of customizing the retail shopping experience based on dynamic item pricing in accordance with some embodiments presented herein.

The following detailed description refers to the accompanying drawings. The same reference numbers in different drawings may identify the same or similar elements.

Provided are systems and methods for customizing the retail shopping experience on an individualized basis. The systems and methods includes a dynamic price orchestration platform ("DPOP") that creates dynamic item pricing for different users based on user profiles that track individual customer data in the cloud or blockchain, and also based on pricing rules that are created for the items by the associated brands or retailers.

The DPOP uses the pricing rules and the user profile information to customize the pricing of each item for each user. The DPOP secures the dynamic pricing of different items for a particular user so that the particular user is only eligible to purchase those items at the dynamic pricing given to the particular user. The DPOP prevents other user from redeeming and/or purchasing a particular item at the dynamic pricing created for another user.

The dynamic item pricing for individual users creates a customized retail shopping experience that specifically targets and appeals to individual interests and preferences of those users. In doing so, brands and/or retailers are able to create customized loyalty programs that are more likely to induce a subsequent visit or purchase than generic coupons that anyone can use for any item.

In some embodiments, the DPOP creates the customized retail shopping experience by remotely integrating with each user's mobile device. The DPOP receives a mobile device identifier from each participating user's mobile device. The DPOP uses the mobile device identifier to obtain a user profile that contains data that has been tracked for the identified user.

The user mobile device is also used to scan items that are of interest to the user, and to provide the item identifying information (e.g., an item identifier) to the DPOP. The DPOP generates the dynamic pricing for the scanned items by applying the user data from the user profile to pricing rules that are defined for the scanned items by the brand or retailer. The DPOP generates the dynamic pricing in real-time as each scanned item information is received from the mobile device. The DPOP provides the dynamic pricing for the scanned items to the user mobile device. The dynamic pricing provides different discounts off the original retail price of the scanned item based on the user's past order history, association between the item and the tracked user interests and/or preferences, environmental factors, and/or other criteria. In some embodiments, providing the dynamic pricing includes distributing codes from the DPOP to the user mobile device for purchasing the scanned items at the determined dynamic pricing.

In some embodiments, the dynamic pricing is presented on the user mobile device via an augmented reality and/or mixed reality ("AR/MR") interface. The AR/MR interfaces presents an image of the scanned item captured by the mobile device camera, and an overlay with the dynamic pricing created for that scanned item by the DPOP. In other words, the AR/MR interface creates a virtual price tag for each item with a price that is customized for each user based on the data that has been tracked for that user in the associated user profile.

FIG. 1 illustrates an example of customizing the retail shopping experience based on dynamic item pricing in accordance with some embodiments presented herein. FIG. 1 illustrates interactions between DPOP 100 and a particular user's mobile device 101.

The particular user activates a camera or other scanner of mobile device 101, and uses the camera to capture (at 102) an image of an item tag. The item tag includes a Quick Response ("QR") code, barcode, or identifying information (e.g., brand name, make and model, serial number, etc.) for the item. In some embodiments, the camera captures an image of the item with or without the item tag. The item has unique identifying features (e.g., colors, patterns, prints, logos, descriptive lettering, etc.) that differentiate that item from other items, and that the unique identifying features may be used to uniquely identify the item.

Mobile device 101 transmits (at 104) the captured (at 102) image with a unique identifier of mobile device 101 (e.g., mobile device identifier) to DPOP 100. In some embodiments, mobile device 101 analyzes the captured (at 102) image to extract the relevant item identifying information or item identifier from the item tag, and transmits (at 104) the extracted item identifying information or item identifier in place of the captured (at 102) image to DPOP 100. In some embodiments, the extracted item identifying information or item identifier may require less bandwidth or data to transmit (at 104) than the image.

The mobile device identifier is a value that uniquely identifies mobile device 101. For instance, the mobile device identifier is a Universal Unique Identifier ("UUID"), International Mobile Equipment Identity ("IMEI"), telephone number, Mobile Equipment Identifier ("MEID"), Electronic Serial Number ("ESN"), International Mobile Subscriber Identity ("IMSI"), Subscription Permanent Identity ("SUPI"), Globally Unique Temporary ID ("GUTI"), Internet Protocol ("IP") address, hardware or device identifier, device signature, and/or other value associated with mobile device 101 or the network identification of mobile device 101.

In some embodiments, the mobile device identifier is derived from a user logging in to an account that is used to obtain the dynamic pricing. For instance, mobile device 101 may transmit a username and password or other security credentials to log into an account established with DPOP 100, the retailer, or the brand associated with the item. A secure account token that uniquely identifies mobile device 101 may be provided upon a successful login. Mobile device 101 may provide the secure account token to DPOP 100, and DPOP 100 may identify mobile device 101 based on the secure account token.

DPOP 100 retrieves (at 106) user profile 103 for mobile device 101 or the user associated with mobile device 101 using the mobile device identifier. User profile 103 is linked to or identify by the mobile device identifier.

User profile 103 and/or user profiles created for other mobile devices or other users may be stored in the "cloud" (e.g., a remote repository or database) or on the blockchain. In some embodiments, user profile 103 contains data associated with or generated by the user of mobile device 101 or data collected directly from mobile device 101 (e.g., location information) over time. For instance, user profile 103 includes data about previous purchases, store visits, demographic information (e.g., age, race, education level, sex, size, etc.), financial information (e.g., average spend, annual income, etc.), social media activity (e.g., number of followers, influencer status, number of posted images, etc.), and/or other information about the user or mobile device 101. In some embodiments, user profile 103 contains anonymized information that is derived from analyzing, evaluating, or performing pattern recognition on the previous purchases, store visits, demographic information, financial information, social media activity, and/or other information. For instance, the anonymized information includes interests and/or preferences of the user as determined from the style of clothing purchased by the user, the price points, the brands, the visited stores, the time of purchase, and/or other factors.

DPOP 100 determines (at 108) a dynamic price for the scanned item based on pricing rule 105 that is defined for the scanned item and adjustments that pricing rule 105 makes to the original or retail price of the scanned item when considering or accounting for the data contained within retrieved (at 106) user profile 103. Determining (at 108) the dynamic price include lowering the original or retail price by different amounts based on tracked interests, preferences, and/or other data in user profile 103 and a computed probability or likelihood that those tracked interests, preferences, and/or data will produce a sale or other desired outcome at different prices.

DPOP 100 records (at 110) a link or association between the dynamic price created for the scanned item and the mobile device identifier that is authorized to purchase or acquire the scanned item at the dynamic price to the blockchain. By recording (at 110) the dynamic price to the blockchain, DPOP 100 immutably establishes the provenance of the dynamic price for the scanned item and for mobile device 101.

In some embodiments, recording (at 110) the dynamic price on the blockchain includes generating a digital code and/or coupon for mobile device 101 to complete a purchase of the scanned item at the dynamic price. The digital code encodes a link to the blockchain block that records (at 110) the dynamic price, the item identifier, and/or the mobile device identifier that is linked to or associated with that dynamic price for the item identifier. By recording (at 110) the mobile device identifier with the dynamic price, other mobile devices or users associated with different mobile device identifiers are prevented from using the digital code or receiving the benefit of the dynamic price that was custom generated for the user associated with mobile device 101.

DPOP 100 provides (at 112) the dynamic price to mobile device 101. In some embodiments, DPOP 100 provides (at 112) the dynamic price as a digital code or in combination with the digital code for redeeming or purchasing the scanned item at the dynamic price. The digital code alters the original or retail price of the scanned item to the dynamic price at a point-of-sale ("POS") device or at a time of purchase.

Mobile device 101 presents the dynamic price on a display to the user. The user may elect to purchase the item at the dynamic price, or continue shopping by scanning other items to reveal the individualized pricing of those items for the user based on the interest, preferences, and/or other data in the user profile.

In some embodiments, the user brings the scanned item to a POS device, and presents the digital code for the dynamic pricing. The POS device scans the item tag to obtain the original or retail price of the item, then scans the digital code to adjust, replace, or update the original or retail price to the dynamic price and to honor the sale of the item at the dynamic price to the user associated with mobile device 101.

In some embodiments, the digital code is electronically or wirelessly transmitted to the POS device, or is automatically applied at the time of sale without the user having to present the digital code. For instance, the POS device may scan the item tag to determine the original or retail price, and may provide a notification for the user to use a mobile device payment method to purchase the item at the dynamic price. The user verifies their identity (e.g., via biometric verification) to open a digital wallet application. The digital wallet application stores the digital code, and automatically transmits the digital code to the POS device or to DPOP 100 to update the pricing at the POS device with the dynamic pricing that was determined (at 108) for that item and that mobile device 101. The user may then complete the transaction by authorizing payment using the mobile device payment method or from the digital wallet application.

Figure 2:
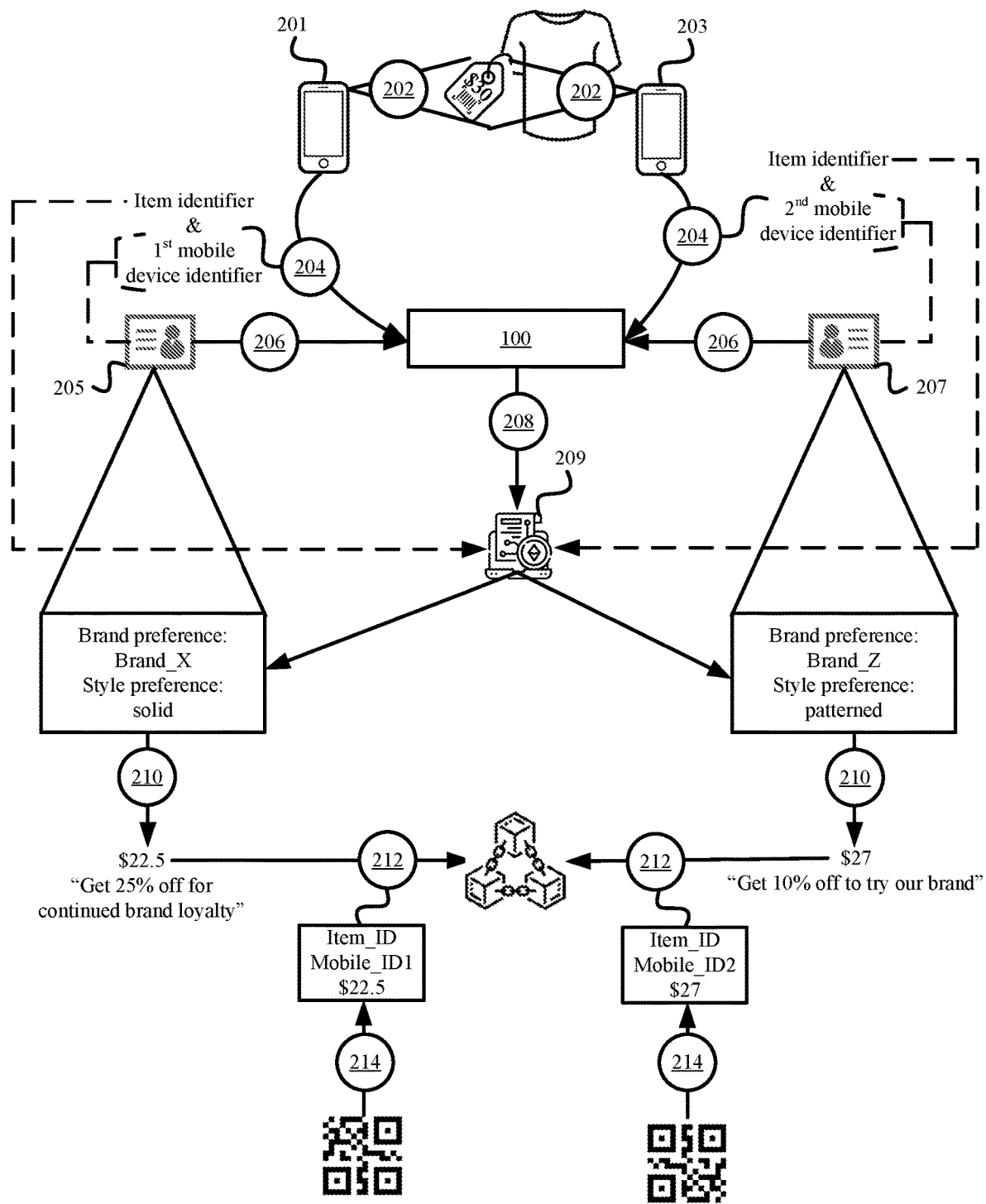
FIG. 2 illustrates the dynamic pricing that is created for the same item based on different user profile data that is tracked for different mobile devices in accordance with some embodiments presented herein.

FIG. 2 illustrates the dynamic pricing that is created for the same item based on different user profile data that is tracked for different mobile devices in accordance with some embodiments presented herein. As shown in FIG. 2, each of two different mobile device 201 and 203 scan (at 202) the same item tag. Mobile devices 201 and 203 send (at 204) the scanned data along with their respective unique mobile device identifiers to DPOP 100.

DPOP 100 retrieves (at 206) the user profile associated with the unique identifier of each mobile device 201 and 203. For instance, DPOP 100 retrieves (at 206) first user profile 205 based on the first unique identifier included with the scanned tag request or message issued by first mobile device 201, and retrieves (at 206) second user profile 207 based on the second unique identifier included with the scanned tag request or message issued by second mobile device 203. Each user profile 205 and 207 contains different data as to purchase history, interest, preferences, and/or other data compiled for the associated mobile device 201 or 203 or the user associated with the identified mobile device 201 or 203.

DPOP 100 obtains (at 208) pricing rule 209 that is defined for the scanned item. Pricing rule 209 includes machine-readable code, conditions, equations, mathematical expressions, and/or conditional elements that establish the dynamic price for the scanned item based on a specific subset of data within the user profiles. For instance, pricing rule 209 sets the dynamic price for the scanned item based on the aggregate amount of prior user purchases spent on the same brand and/or the number of other items previously purchased from the same brand as the scanned item. A more complex pricing rule sets the dynamic price for a shirt of a particular brand based on whether or not the user profile indicates a previous purchase of pants of the particular brand in the past year, or sets the price of a shirt with a particular style or pattern (e.g., slim cut, boot cut, low-rise, boho, business-casual, formal, polka dot, striped, checkered, etc.) based on whether or not the user profile indicates a user interest or preference for that particular style or pattern.

DPOP 100 calculates (at 210) a different dynamic price for the same scanned item for mobile device 201 than for mobile device 203 based on the different values contained for the specific subset of data within each user profile 205 and 207 and the evaluation and/or weighting of those different values by pricing rule 209. As shown in FIG. 2, first user profile 205 specifies a user preference for the particular brand of the scanned item based on past purchase history, and a user preference for the solid coloring of scanned item. Second user profile 207 specifies a user preference for a competitor brand, and a user preference for patterned designs. The particular brand may consider mobile device 201 associated with first user profile 205 to have a higher likelihood of purchasing the scanned item than mobile device 203 associated with second user profile 207. Accordingly, the particular brand may define pricing rule 209 to promote the loyalty and interests of the user associated with mobile device 201 by offering the scanned item at a lower dynamic price (e.g., more discounts) than the dynamic price given to the user associated with mobile device 203. Alternatively, the particular brand may run a campaign to convert users of the competitor brand, and may define pricing rule 209 to offer the scanned item at a lower dynamic price to mobile device 201 than to mobile device 203. In any case, pricing rule 209 is fully customizable, and may calculate (at 210) the different dynamic pricing for mobile device 201 and 203 using any or all data within user profiles 205 and 207, and/or by prioritizing different values within the selected user profile data.

DPOP 100 securely provides the different dynamic prices to each mobile device 201 and 203 in a manner that prevents mobile device 201 or other devices from purchasing the scanned item at the dynamic price set for mobile device 203, and that prevents mobile device 203 or other devices from purchasing the scanned item at the dynamic price set of mobile device 201.

In some embodiments, DPOP 100 secures the dynamic pricing by recording (at 212) the item identifier for the scanned item at the first dynamic price set for mobile device 201 to the mobile device identifier of mobile device 201 on the blockchain, and by recording (at 212) the same item identifier for the scanned item at the second dynamic price set for mobile device 203 to the mobile device identifier of mobile device 203 on the blockchain. DPOP 100 creates (at 214) and provides each mobile device 201 and 203 with a digital code, Uniform Resource Locator ("URL"), and/or another link to the created blockchain blocks and/or for verifying the dynamic pricing at which the scanned item is offered to each mobile device 201 and 203 based on the different user data associated with each mobile device 201 and 203 in their respective user profiles 205 and 207. In some embodiments, DPOP 100 secures the dynamic pricing by providing the created (at 214) digital codes directly to the digital wallet application of each mobile device 201 and 203 with a lock that prevents the digital codes from being shared from one wallet or one mobile device to another. In other words, the digital codes are invalidated or become unusable if presented from a digital wallet application or mobile device with a different mobile device identifier than the mobile device identifier associated with the mobile device that is authorized to use the digital code. In this manner, the dynamic pricing is customized and secured on an individual basis.

A POS device verifies and/or applies the different dynamic pricing at which mobile device 201 and 203 may purchase the scanned item when presented with the eligible digital code. In some embodiments, the POS device automatically verifies and/or applies the dynamic pricing based on the digital code being secured for use and/or presented by a mobile device with a specific mobile device identifier. In some other embodiments, the digital codes are automatically sent before or with payment information from mobile devices 201 and 203 to the POS device for the adjusted item pricing that is customized for each mobile device 201 and 203.

Figure 3:
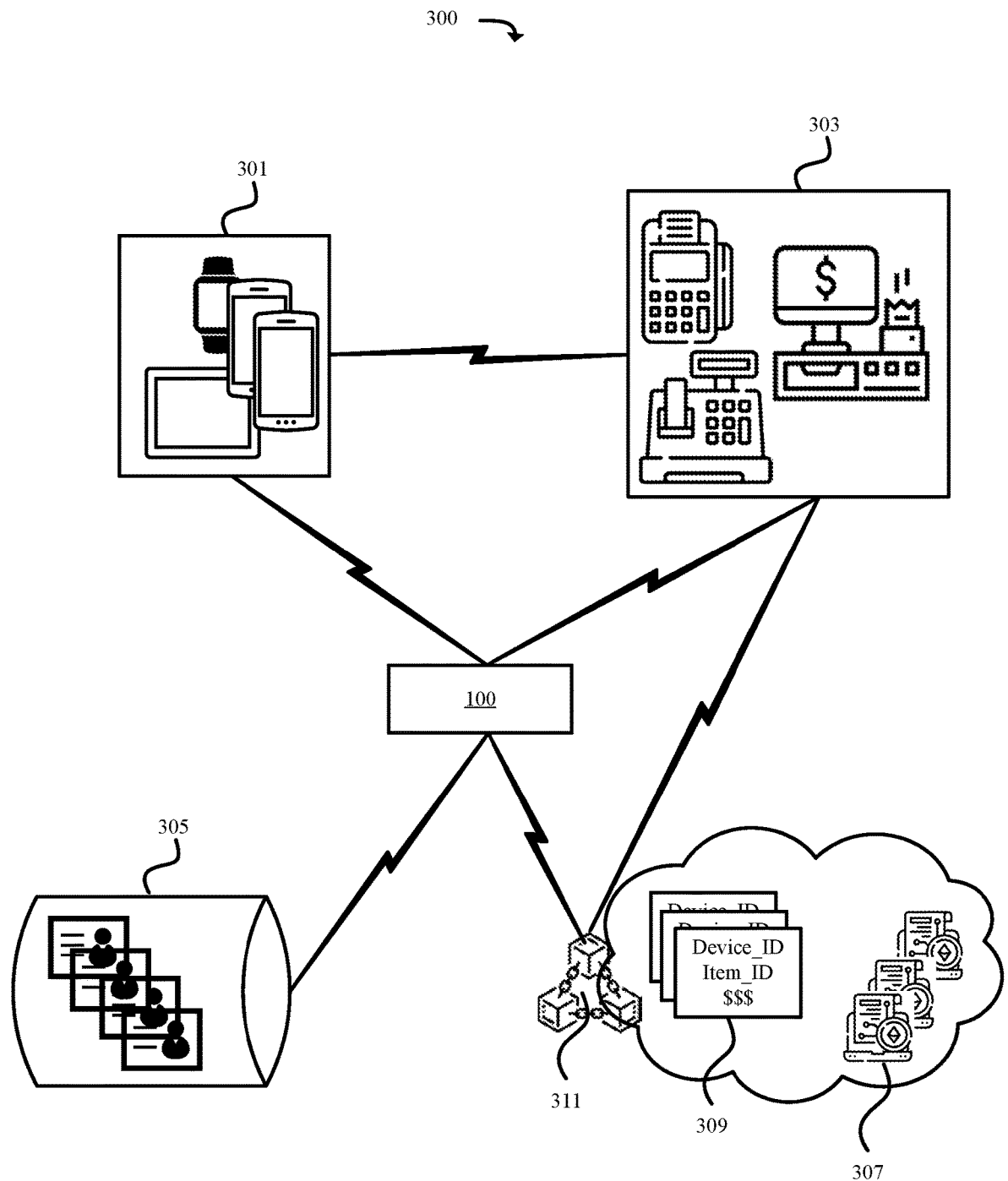
FIG. 3 illustrates an example architecture for creating the customized retail shopping experience on an individualized basis in accordance with some embodiments presented herein.

FIG. 3 illustrates an example architecture 300 for creating the customized retail shopping experience on an individualized basis in accordance with some embodiments presented herein. Architecture 300 includes DPOP 100, mobile devices 301, POS devices 303, user profile repository 305, pricing rules 307, and digital code repository 309. In some embodiments, various components of architecture 300 are implemented in the cloud and/or on blockchain 311. In some embodiments, architecture 300 provides the dynamic pricing for different mobile devices 301, POS devices 303, brands, retailers, sites, etc.

DPOP 100 includes one or more devices or machines with processors, memory, storage, network, and/or other hardware resources for generating the dynamic pricing and/or applying the dynamic pricing at the time of purchase. Specifically, DPOP 100 communicates with mobile devices 301 over a data network to determine and provide the dynamic pricing, and communicates with POS devices 303 to apply the dynamic pricing at the time of purchase.

Mobile devices 301 include smartphones, smartwatches, wearable devices, headsets, tablets, laptop computers, Internet-of-Things ("IoT") devices, and/or other portable devices with a camera, scanner, or other imaging sensor and with network connectivity for communicating with DPOP 100 over a data network. In some embodiments, mobile devices 301 include AR/MR devices that scan item tags, and that present the dynamic pricing that is received from DPOP 100 over images of the items or item tags.

POS devices 303 include registers, scanners, smartphones, tablets, and/or other electronic devices with which transactions are processed by a retailer or merchant. POS devices 303 have network connectivity to integrate with DPOP 100 for receipt, confirmation, and/or application of the dynamic pricing for the items sold by the retailer or merchant.

In some embodiments, a merchant, retailer, or brand registers with DPOP 100 to receive the dynamic pricing for the items they sell. Registration may include configuring POS devices 303 to access DPOP 100 for the dynamic pricing offered to different users or mobile device 301 for different items. Registration may also include configuring POS devices 303 to directly verify and/or obtain the dynamic pricing from blockchain 311.

To generate the dynamic pricing on an individualized basis, DPOP 100 accesses user profile repository 305 using the unique identifiers of mobile devices 301. In some embodiments, DPOP 100 accesses user profile repository 305 in response to dynamic pricing requests that mobile devices 301 submit to DPOP 100 for different items. The dynamic pricing requests issued by a particular mobile device 301 include the unique mobile device identifier of the particular mobile device 301, an image of the item or item tag for which the dynamic pricing is requested, and/or the item identifier that is extracted from an image of the item or item tag for which the dynamic pricing is requested.

User profile repository 305 stores the user profile for each mobile device 301. A user profile is created for each mobile device 301 and is associated and/or accessible using the mobile device identifier of that mobile device 301.

The user profile associated with a particular mobile device identifier is a compilation of data that has been tracked or aggregated over time about the interests and preferences of the user or mobile device 301 identified by the particular mobile device identifier. Different merchants or retailers may add data to the user profiles as the associated users or mobile devices 301 purchase items from the merchants, visit the merchant stores or locations, browse merchant websites, and/or perform other interactions with the merchants or retailers. DPOP 100 may also add user data to the user profiles by tracking interactions or activity on the associated user's mobile device 301. For instance, users may register their mobile devices 301 with DPOP 100 or may authorize accounts that they have with various retailers or merchants to provide the dynamic pricing via DPOP 100. As part of the registration, the users may permit DPOP 100, retailers, and/or merchants to track data generated by the users using their mobile devices 301 and/or from direct interactions the users have with the retailers or merchant, and to enter the tracked data into their associated user profiles. As noted above, the user data stored in the user profiles may be derived from specific user activity and/or may be anonymized to identify interests and/or preferences of the user rather than the actual tracked activity.

In some embodiments, the user profiles combine user data that is distributed and stored in separate merchant accounts. For instance, a particular user may create a first merchant account with a first merchant, perform various interactions with the first merchant that are tracked to the first merchant account, create a second merchant account with a second merchant, perform various interactions with the second merchant that are tracked to the second merchant account, and the user profile for the particular user may link to and consolidate the different user data that is stored in the first merchant account and the second merchant account based on partnerships established between the first merchant, second merchant, and DPOP 100.

In some embodiments, user profile repository 305 stores the user profiles in a distributed manner on blockchain 311. In some other embodiments, user profile repository 305 includes one or more storage devices in the cloud.

DPOP 100 applies the user data within the user profiles to pricing rules 307 that were defined for each item for which a dynamic price is to be computed. Pricing rules 307 for each item of a set of items are defined by the brands and/or retailers that sell that set of items.

Each pricing rule 307 is associated with one or more item identifiers. The item identifiers include one or more of the item QR code, barcode, serial number, name, make and model, and/or other textual or visual features that uniquely differentiate each item from other items. Accordingly, DPOP 100 uses an item identifier provided with or derived from a mobile device's dynamic pricing request to select the pricing rule 307 that was defined for the item identified by the item identifier.

Each pricing rule 307 is defined with machine-executable code, conditions, equations, mathematical expressions, and/or conditional elements that determine the dynamic price for the associated item based on values for a specific subset of user data in the user profiles. In some embodiments, each pricing rule 307 is defined with the original or retail price of an item, and code, condition, equations, mathematical expressions, and/or conditional elements that adjust (e.g., lower) the original or retail price by different amounts based on purchase history, browsing history, store visit history, user interactions with different items or retailers, social media activity, interests, preferences, and/or other specific user data within the user profiles.

For instance, a pricing rule 307 may output a first price for a particular item when the user data in the user profile identifies one prior purchase of another item from the same brand, and may output a second price for the particular item when the user data in the user profile identifies five prior purchases of other items from the same brand. A more complex pricing rule 307 may determine a first price for a particular item when the user data specifies a first style preference, lists a prior purchase of a complimentary item, and identifies the user to be an influencer on social media. The same complex pricing rule 307 may determine a second price for the particular item when any one or more of the style preference, prior purchase, and influencer status of the user changes.

Merchants and/or brands define different pricing rules 307 for their various items to specifically promote certain items to certain groups of users and other items to other groups of users. Pricing rules 307 are defined to directly target different types or classes of users and to appeal to their individualized interests or preferences. For instance, a retailer may perform market research to determine factors around conversation rates associated with different classes of users, and may define pricing rules 307 based on the determined factors. Specifically, the market research may identify that teenagers often purchase three articles of clothing at one time and that one particular clothing item is trending. Accordingly, a retailer may define a pricing rule 307 that applies to teenagers (e.g., age information stored in the user profiles) and that provides a discount on the one particular clothing item to incentivize the teenagers to purchase the one particular clothing item at the discounted price and the other items at original undiscounted prices. Similarly, the market research may identify that a competitor is outselling a retailer on a particular luxury good. In this case, the retailer may define pricing rule 307 to discount the price of the particular luxury good for users with a purchase history of luxury goods, with annual incomes over a threshold, that meet other demographic criteria, and/or that have purchased or shown an interest for other goods with a similar style, pattern, and/or other characteristics as the particular luxury good.

Brands (e.g., manufacturers) may also define pricing rules 307 in combination with or independent of the retailers or merchants that sell their goods. By allowing brands to define pricing rules 307, the customized pricing for a particular item may be provided to a user regardless of which merchant or retailer the user prefers that sells that item. This allows the brands to build brand loyalty, to promote their goods wherever they are sold, and/or to create customized brand-specific campaigns rather than rely on retailers or merchants to promote their goods.

In any case, the individualized pricing output by pricing rules 307 provides for more customized promotional targeting on a per user basis. Specifically, pricing rules 307 may be defined to appeal to specific interests, preferences, and/or other user data that will increase the rate of conversion and sales volume relative to generic promotions or campaigns that anyone can use or that apply to a variety of goods or brands that may or may not be of interest to large groups of users receiving those generic promotions or campaigns. The dynamic pricing produced by pricing rules 307 for the different user data contained in the user profiles creates better brand loyalty by customizing the item pricing for the interests, preferences, and/or needs of each individual.

In some embodiments, pricing rules 307 are smart contracts that are stored on blockchain 311. Smart contracts contain machine-executable code that compute the dynamic pricing for goods based on values specified for a set of user data within the user profiles.

DPOP 100 selects the correct pricing rule 307 for a particular item based on the item identifier that uniquely identifies the particular item and that is provided with a dynamic pricing request after scanning of the item or item tag by a mobile device 301. In other words, pricing rules 307 are linked to or identified by an item identifier. Many different pricing rules 307 may be defined for the same item identifier. In such cases, DPOP 100 may compute different dynamic pricing for the same item and the same request based on the different pricing rules 307 defined for the item identifier of that item, and may provide the lowest dynamic price to the mobile device of the requesting user.

When DPOP 100 receives a dynamic pricing request for an item that does not have a defined pricing rule 307, DPOP 100 may respond by providing the original retail price of the item to the requesting mobile device 301. In some embodiments, DPOP 100 has access to a pricing database of each merchant or database and overrides the original retail pricing in the pricing database when a pricing rule 307 has been defined for the item and the user data associated with the requesting mobile device 301 satisfies the pricing rule conditions for an adjusted price.

Digital code repository 309 stores the digital codes for redeeming or purchasing items at the dynamic pricing determined for different mobile devices 301. The digital codes within digital code repository 309 are dynamically generated by DPOP 100 upon determining a dynamic price at which a particular user or mobile device 301 may purchase a particular item. Accordingly, DPOP 100 encodes each digital code with a specific price or discount amount for a particular item (e.g., identified by a particular item identifier) at which a particular mobile device with a specific mobile device identifier is able to purchase the particular item.

In some embodiments, the digital codes are digital coupons with a barcode, QR code, alphanumeric character string, or other machine-readable value that may be scanned, transmitted, or otherwise conveyed from mobile devices 301 or DPOP 100 to POS devices 303. DPOP 100 may record the digital codes to blockchain 311, and may provide a visual representation of the digital codes to mobile devices 301. The visual representation encodes a link (e.g., a Uniform Resource Locator ("URL"), blockchain address, and/or other identifier) for accessing the dynamic price, the item identifier, and the mobile device unique identifier that are associated with the digital code stored blockchain 311.

Storing the digital codes from digital code repository 309 to blockchain 311 verifies the provenance of each dynamically determined price, and prevents the unauthorized sharing, creation, and/or accessing of the digital codes. Accordingly, POS devices 303 may access the digital codes from digital code repository 309 to verify that a user associated with a particular mobile device 301 is eligible to receive a dynamic price for an item, and to honor the dynamic price created for that item by DPOP 100.

Figure 4:
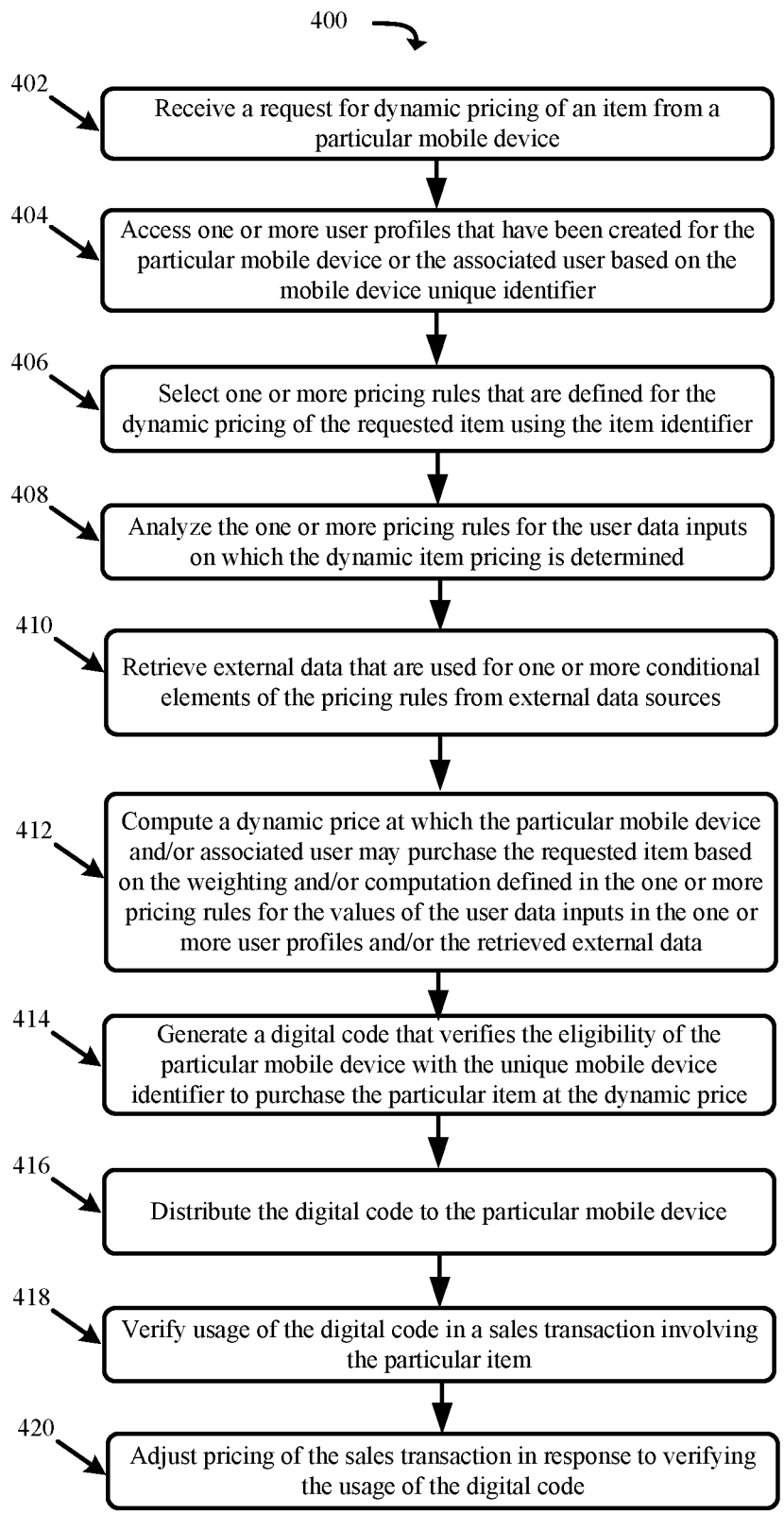
FIG. 4 presents a process for generating and applying the dynamic pricing at a point-of-sale ("POS") in accordance with some embodiments presented herein.

FIG. 4 presents a process 400 for generating and applying the dynamic pricing at a POS in accordance with some embodiments presented herein. Process 400 is implemented by DPOP 100 and/or by the collective usage of components from architecture 300.

Process 400 includes receiving (at 402) a dynamic pricing request from a particular mobile device. The dynamic pricing request includes identifying information for the item that is the subject of the dynamic pricing request. The identifying information is the item identifier or information from which the item identifier may be determined. For example, the identifying information may be an image of the item tag. DPOP 100 may use one or more image processing routines to identify and extract unique features of the item, and may query an item database to identify the item in the image based on the extracted unique features and to obtain the item identifier for the item. As another example, the identifying information may be an image of the item price tag or label. DPOP 100 may use one or more image processing routines to directly extract the item identifier from the image of the item price tag or label. The dynamic pricing request further includes the unique mobile device identifier of the mobile device that submitted the request and/or an original or retail price of the item.

Receiving (at 402) the dynamic pricing request includes receiving a HyperText Transfer Protocol ("HTTP"), Application Programming Interface ("API") call, or network data packet or message with the item identifying information (e.g., the item identifier), the original or retail item price, and/or the mobile device identifier. In some embodiments, the mobile device identifier is contained within the data packet header.

Process 400 includes accessing (at 404) one or more user profiles that have been created for the particular mobile device or the associated user based on the mobile device unique identifier. Specifically, DPOP 100 accesses (at 404) the user data that has been tracked or collected for the particular mobile device or associated user over time.

In some embodiments, the mobile device unique identifier may be linked to a user identifier as one user may have multiple devices that they use or carry with them. For instance, DPOP 100 may store a mapping table that converts the mobile device identifiers associated with a particular user to the single user identifier. In some other embodiments, the user identifier is obtained after the user performs a login procedure to a user account registered with DPOP 100, a merchant, or brand. In some such embodiments, the user account is associated with the user identifier. In any case, DPOP 100 may access (at 404) the one or more user profiles using the user identifier or mobile device identifier of the particular mobile device issuing the dynamic pricing request.

Process 400 includes selecting (at 406) one or more pricing rules that are defined for the dynamic pricing of the requested item using the item identifier. The pricing rules may include smart contracts that are recorded to the blockchain. DPOP 100 may generate the link or address for accessing the relevant smart contracts from the blockchain using the item identifier and/or other item identifying information (e.g., brand name, make and model, item name, patterning, coloring, etc.). In other words, DPOP 100 uses the item identifier to retrieve the one or more pricing rules that are defined for the dynamic pricing of the requested item.

Process 400 includes analyzing (at 408) the one or more pricing rules for the user data inputs on which the dynamic item pricing is determined. For instance, DPOP 100 may inspect the code, formula, mathematical expressions, and/or conditional elements to determine the user data inputs or user profile data on which the one or more selected (at 406) pricing rules are based.

In some embodiments, the one or more pricing rules factor and/or are based on external data that is not contained within the user profiles. For instance, the one or more pricing rules may include conditional elements that modify or alter pricing of the requested item based on the weather, time-of-day, time-of-year, news, nearby events, social media trends, trending topics, and/or other environmental, temporal, or contextual data that may be sourced by DPOP 100 from the Internet or data sources other than the user profiles. Accordingly, process 400 includes retrieving (at 410) external data that are used for one or more conditional elements of the pricing rules from external data sources.

Process 400 includes computing (at 412) a dynamic price at which the particular mobile device and/or associated user may purchase the requested item based on the weighting and/or computation defined in the one or more pricing rules for the values of the user data inputs in the one or more user profiles and/or the retrieved (at 410) external data. Computing (at 412) the dynamic price includes custom configuring and executing the one or more pricing rules to use the values from a specific subset of user data within the one or more user profiles that correspond to the user data inputs of the one or more pricing rules, and applying the values to corresponding conditional elements of the one or more pricing rules. The pricing rules then output the dynamic price based on merchant-defined formulas that use the user-specific values for that specific subset of user data as inputs.

Process 400 includes generating (at 414) a digital code that verifies the eligibility of the particular mobile device with the unique mobile device identifier to purchase the particular item at the dynamic price. In some embodiments, generating (at 414) the digital code includes recording the dynamic price with the item identifier and the mobile device identifier as a block on the blockchain, and providing the address or a link to that block as part of the digital code. The digital code may also include a visualization of the dynamic price for the particular item that may be presented on the particular mobile device to the associated user.

Process 400 includes distributing (at 416) the digital code to the particular mobile device. In some embodiments, distributing (at 416) the digital code includes providing a graphic, image, text, and/or other information for presenting the computed (at 412) dynamic price on the particular mobile device to the associated user along with a link, barcode, QR code, and/or other machine-readable tag for redeeming the dynamic price when purchasing the particular item at a merchant's POS. In some other embodiments, distributing (at 416) the digital code includes entering the digital code into a mobile or digital wallet on the particular mobile device. In some such embodiments, the digital code is securely entered into the mobile wallet by verifying that the unique mobile device identifier of the particular mobile device matches the unique mobile device identifier of the mobile device that is authorized to use the digital code and obtain the dynamic price, and by downloading the digital code into the mobile wallet with restrictions that prevent the sharing of the digital code from the particular mobile device with other devices or other users. For instance, the dynamic price may be presented in the mobile wallet, but the digital code for changing the original or retail price of the requested item at the merchant POS may be encrypted or hidden, and may be wirelessly transmitted to the merchant POS in response to a user action (e.g., opening the mobile wallet with the particular mobile device in wireless range of the merchant POS, initiating payment for the requested item via the digital wallet and the particular mobile device, receiving a wireless message from DPOP 100 or the merchant POS, etc.).

Process 400 includes verifying (at 418) usage of the digital code in a sales transaction involving the particular item. Verifying (at 418) the usage of the digital code involves verifying that the mobile device attempting to use the digital code has the same unique mobile device identifier that is recorded as part of the digital code or is associated with the digital code on the blockchain, and that the sales transaction involves the particular item for which the digital code was created.

Process 400 includes adjusting (at 420) pricing of the sales transaction in response to verifying (at 416) the usage of the digital code. Adjusting (at 420) the pricing includes changing the original or retail pricing of the requested item to the dynamic price that was computed (at 412) for the requested item and the particular mobile device. For instance, DPOP 100 modifies the item pricing at the merchant POS before the transaction is completed, or modified the item pricing after the transaction is completed and payment information is received from the particular mobile device or the associated user. Specifically, the merchant POS may record the transaction at the original or retail price, DPOP 100 may reconcile or change the pricing of the recorded transaction to the computed (at 412) dynamic pricing, and payment in the amount of the dynamic price may be collected from a credit card, bank, or other payment processor.

In some embodiments, verifying (at 418) the usage and adjusting (at 420) the pricing is performed based on network messaging exchanged between the POS device and DPOP 100. In some other embodiments, verifying (at 418) the usage and adjusting (at 420) the pricing is performed entirely by the POS device and/or the POS device accessing information about the digital code from the blockchain.

Figure 5:
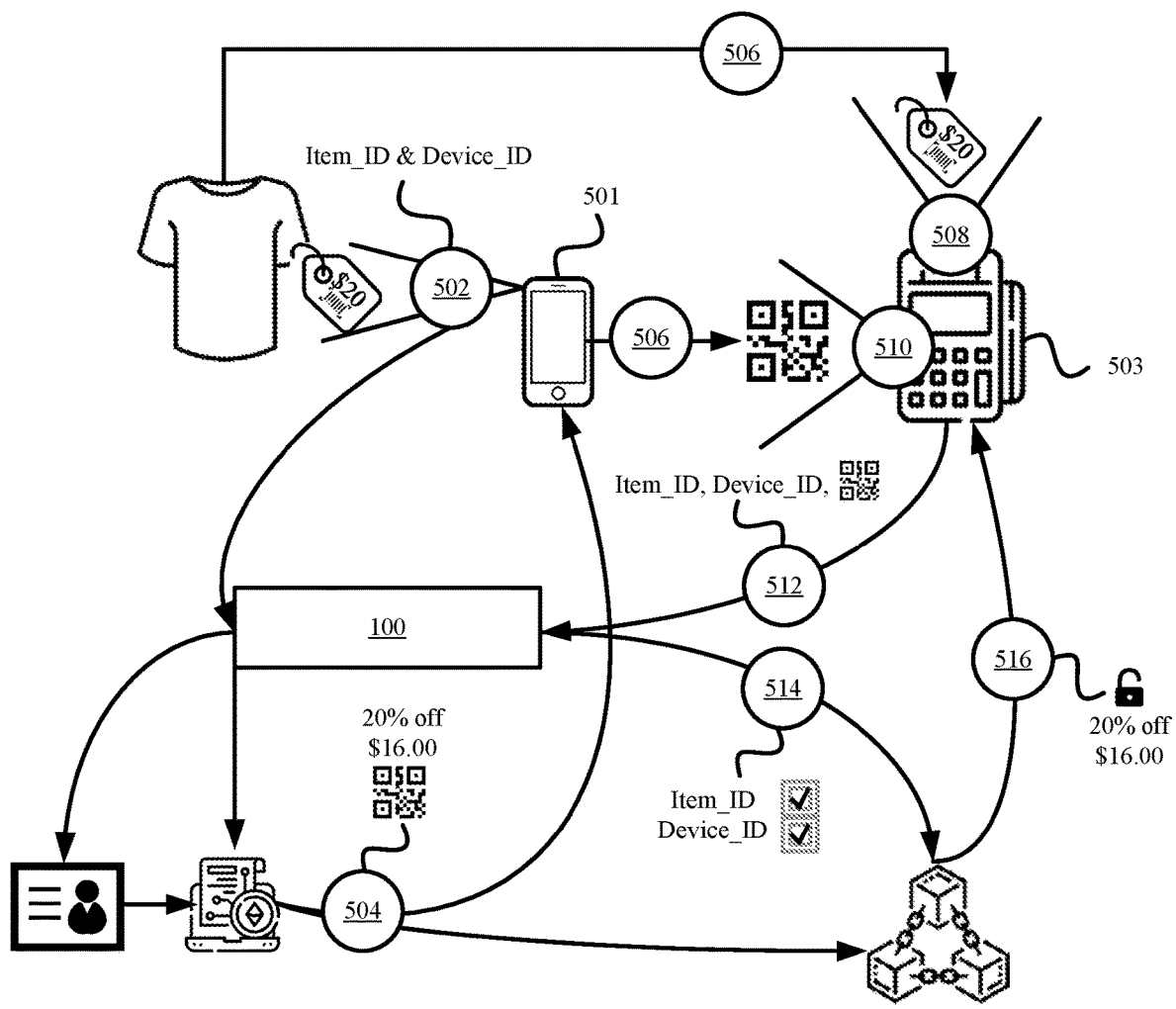
FIG. 5 illustrates an example of verifying the usage of a digital code and adjusting the item pricing in accordance with some embodiments presented herein.

FIG. 5 illustrates an example of verifying the usage of a digital code and adjusting the item pricing based on messages exchanged between the POS device and DPOP 100 in accordance with some embodiments presented herein. A user scans (at 502) and obtains (at 504) the dynamic pricing for a particular item from DPOP 100 on their mobile device 501. Specifically, mobile device 501 receives (at 504) the digital code for purchasing the particular item at the discounted or adjusted dynamic price.

The user brings (at 506) the particular item and mobile device 501 to POS device 503. A cashier or agent initiates the checkout process by scanning (at 508) the particular item tag, and by scanning (at 510) the digital code that is displayed on mobile device 501 using a scanner of POS device 503.

POS device 503 transfers (at 512) the item identifier, the mobile device identifier of mobile device 501, and/or the digital code to DPOP 100. DPOP 100 retrieves and/or decodes the digital code information from the blockchain. For instance, DPOP 100 retrieves and/or decodes the item identifier, the mobile device identifier, and the dynamic price that were recorded and/or encoded as part of the digital code on the blockchain. DPOP 100 verifies (at 514) that the item identifier decoded from the digital code is the same as the item identifier for at least one of the items being purchased, verifies that the mobile device identifier of mobile device 501 attempting to use the digital code matches the mobile device identifier that is encoded as part of the digital code, and provides (at 516) the adjusted dynamic price encoded with the digital code to POS device 503. In some embodiments, DPOP 100 searches the blockchain using a URL, link, identifier, address, and/or other values of the digital code for a block containing the item identifier, mobile device identifier, and the dynamic price that are associated with the digital code.

POS device 503 displays the adjusted dynamic price to the user. The user may complete the transaction for the particular item by submitting payment in the amount of the adjusted dynamic price.

Figure 6:
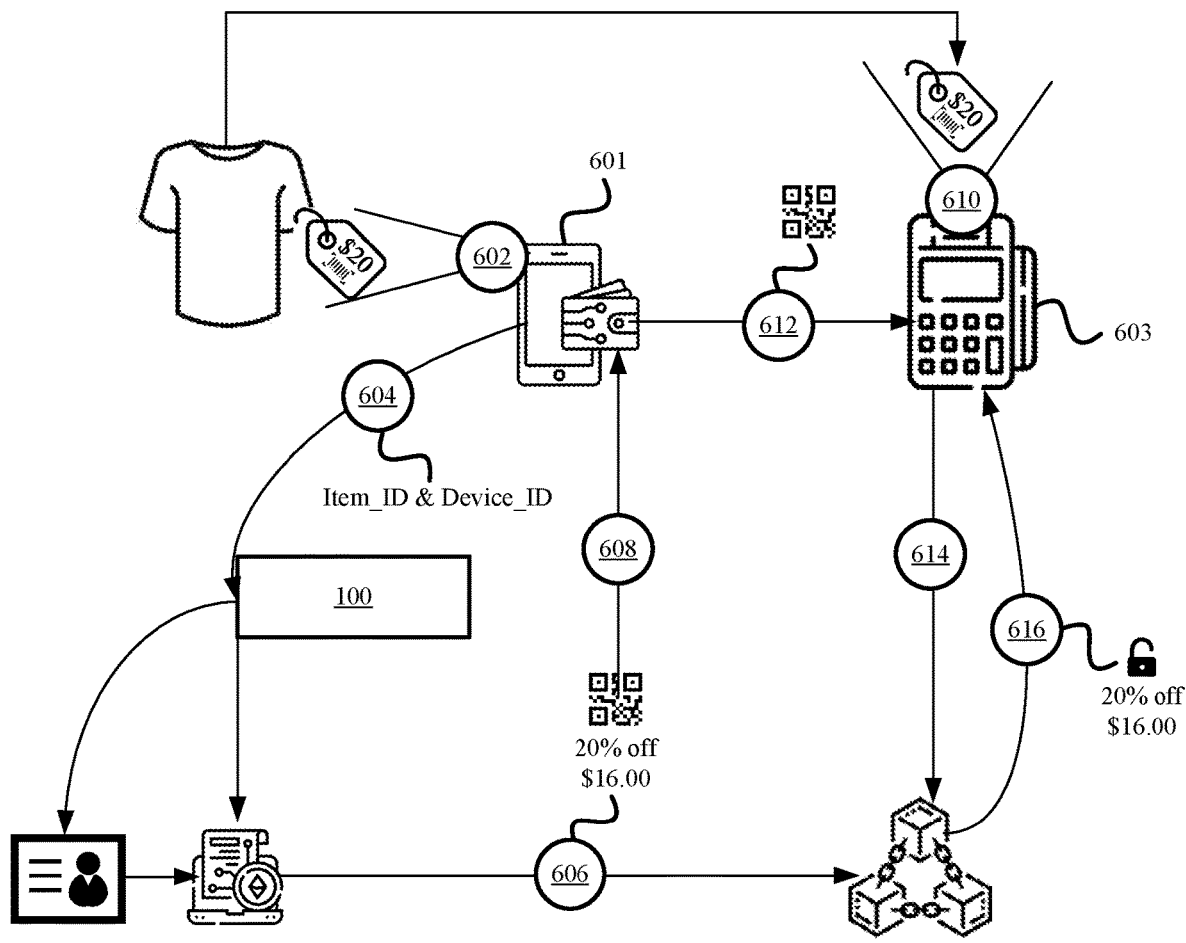
FIG. 6 illustrates an example of directly applying the dynamic pricing at the POS in accordance with some embodiments presented herein.

In some embodiments, the application of the dynamic pricing may be performed automatically and/or directly between the user mobile device and the POS device without further communication with DPOP 100. FIG. 6 illustrates an example of directly applying the dynamic pricing at the POS in accordance with some embodiments presented herein.

The dynamic pricing is generated in response to mobile device 601 scanning (at 602) a particular item tag, and mobile device 601 transmitting (at 604) the item identifier and the mobile device identifier to DPOP 100. DPOP 100 determines and records (at 606) the dynamic price at which the particular item, that is identified by the item identifier, is offered to mobile device 601, that is identified by the mobile device identifier, on the blockchain. Additionally, DPOP 100 generates (at 606) the digital code for accessing the blockchain entry, and enters (at 608) the digital code into the digital wallet application of mobile device 601.

The user brings the particular item and mobile device 601 to POS device 603. The cashier or agent initiates the checkout process by scanning (at 610) the particular item tag. POS device 603 also receives (at 612) the digital code that was entered to the digital wallet application of mobile device 601. In some embodiments, the user completes a secure identity verification using biometrics or other secured form of access in order to open the digital wallet application and present the digital code for scanning by POS device 603. In some other embodiments, mobile device 601 automatically transmits the digital code to devices (e.g., POS device 603) that are within Near-Field Communication ("NFC") or Bluetooth range of mobile device 601 in response to securely unlocking and accessing the digital wallet application.

POS device 603 verifies the mobile device identifier by virtue of the digital code being entered into and accessible from the digital wallet application of mobile device 601. In other words, POS device 603 indirectly verifies that the digital code provided by mobile device 601 to POS device 603 is generated for mobile device 601 because the digital code was securely entered into the digital wallet application of mobile device 601 by DPOP 100 and is not accessible by other mobile devices. Alternatively, mobile device 601 may wirelessly transmit its mobile device identifier with the digital code to POS device 603.

POS device 603 performs (at 614) a lookup of the digital code on the blockchain using a URL, link, address, and/or other value encoded within the digital code. As a result of performing (at 614) the lookup, POS device 603 retrieves (at 616) the dynamic price at which the particular item, that is identified by the item identifier, is offered to mobile device 601 that provided (at 612) the digital code that was used to access the dynamic price from the blockchain.

In response to confirming that the dynamic price applies to at least one item being purchased by the user, POS device 603 adjusts the pricing for that one item to reflect the dynamic price that is recorded for that particular item and for that user on the blockchain, and the user completes the transaction at the adjusted dynamic price.

DPOP 100 may generate and link digital codes and/or dynamic prices for different items on the blockchain to the unique mobile device identifier of a particular mobile device that is authorized to use those digital codes. When linked to the mobile device identifier, multiple digital codes and/or the dynamic pricing for several different items may be redeemed at one time without the user having to find and present each digital code for each item that has a dynamic price at the POS. Instead, the mobile device identifier is all that is needed for the POS device or DPOP 100 to retrieve and apply the different dynamic pricing for the two or more items beings purchased at one time.

Figure 7:
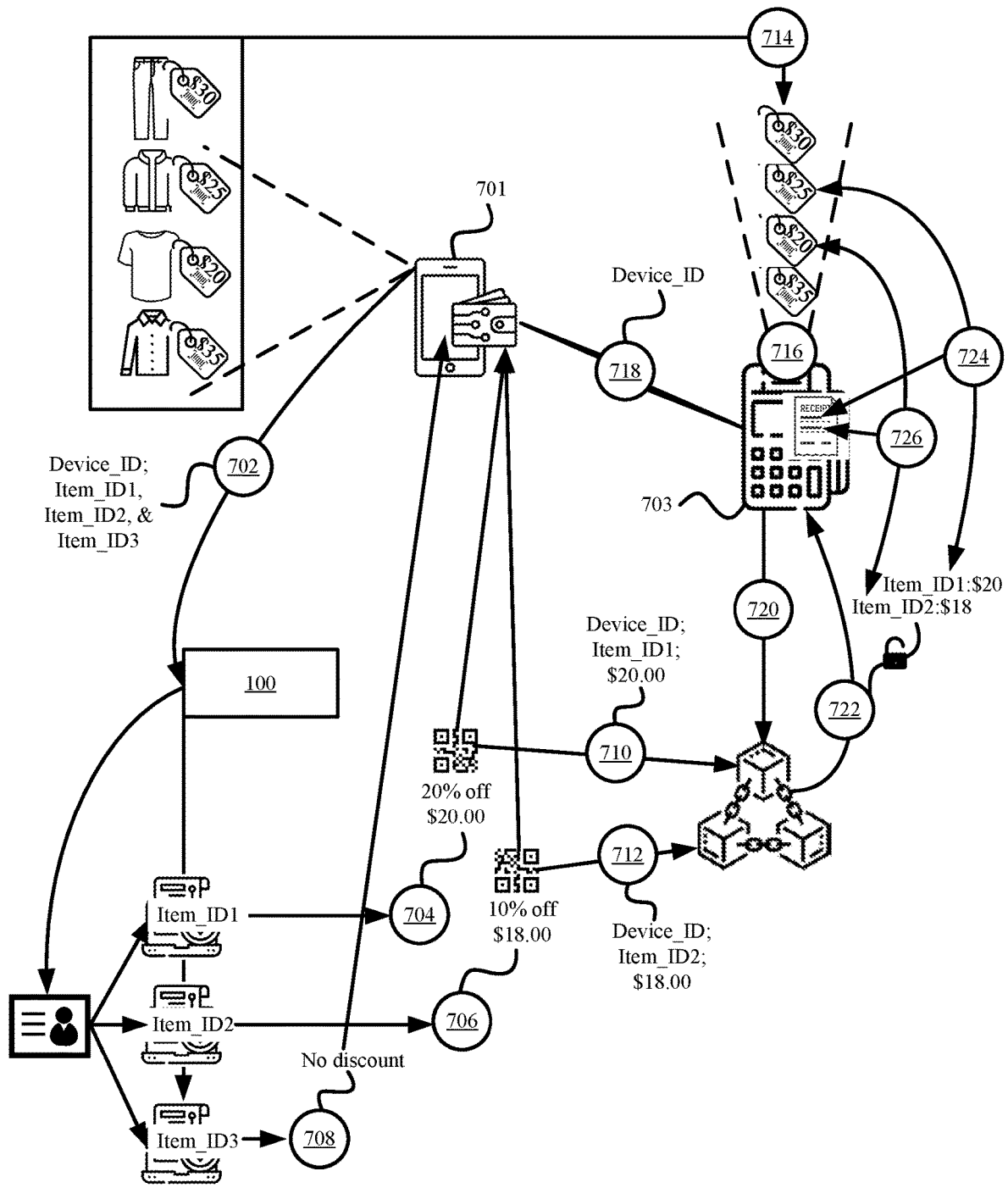
FIG. 7 illustrates an example of applying dynamic pricing for multiple items at one time in accordance with some embodiments presented herein.

FIG. 7 illustrates an example of applying dynamic pricing for multiple items at one time in accordance with some embodiments presented herein. As shown in FIG. 7, mobile device 701 issues (at 702) dynamic price requests for three out of four items that a user selects to purchase. Mobile device 701 sends each dynamic price request to DPOP 100. Each dynamic price request includes the same unique mobile device identifier of mobile device 701 and a different item identifier that is obtained from the scanning of the different items.

DPOP 100 determines (at 704 and 706) a dynamic price for the first and second items that is different than the original or retail price of those items based on pricing rules that use different user data within the user profile associated with mobile device 701 and different formulas or algorithms to compute the different individualized prices of the first and second items for mobile device 701. DPOP 100 determines (at 708) that the dynamic price for the third item is the same as the original or retail price of that item. In other words, the user does not receive any discount or adjusted pricing for the third item. The determined (at 704, 706, and 708) for the three scanned items are provided to mobile device 701 and are displayed to the user via an AR/MR view created for the associated tags or a presentation of the pricing on the display.

DPOP 100 creates (at 710 and 712) a record for the dynamic pricing of the first item and the second item on the blockchain, and links the blockchain records or blocks to the mobile device unique identifier. In other words, the different dynamic pricing created for mobile device 701 and the different scanned items (e.g., the first item and the second item) become associated with the mobile device identifier of that mobile device 701, and are accessible using the mobile device identifier.

The user initiates the checkout process of purchasing the four items by submitting (at 714) the items to POS device 703. POS device 703 scans (at 716) the items. Before, during, or after the scanning (at 716) of the items, the user interacts with mobile device 701 to wirelessly transmit (at 718) the mobile device identifier to POS device 703 using NFC, Bluetooth, and/or another wireless technology that may also be used for secure mobile payments and/or communications between the digital wallet application and POS device 703. For instance, as part of initiating the checkout process, the user performs a biometric verification or enters secure access credentials to open access to the digital wallet application. The digital wallet application executes code that detects the entry of one or more digital codes in the digital wallet application, and automatically transmits the mobile device identifier to POS device 703 upon being opened and detecting the one or more digital codes. In some embodiments, the digital wallet application open and presents the user with a prompt if they would like to apply the digital codes for the dynamic pricing and/or receive the dynamic pricing. In response to the user confirming their desire to use the digital codes, mobile device 701 transits the mobile device identifier to POS device 703.

POS device 703 receives (at 718) the mobile device identifier, and queries (at 720) the blockchain for digital codes that are associated with that mobile device identifier. In response to the query, POS device 703 receives (at 722) the first dynamic price that was generated for the first item based on a first set of data from the user profile that is associated with mobile device 701 and a first pricing rule that is defined for the first item and the second dynamic price that was generated for the second item based on a different second set of data from the same user profile and a second pricing rule that is defined for the second item.

POS device 703 compares the item identifiers for the dynamic prices that were associated with and received (at 718) for the mobile device identifier. POS device 703 adjusts (at 724) the price for the first scanned item with the first item identifier to the first dynamic price that was received for that first item identifier, and adjusts (at 726) the price for the second scanned item with the second item identified to the second dynamic price that was received for that second item identifier. In some embodiments, the pricing is adjusted (at 724 and 726) as the items are being scanned with POS device 703 and/or before the user payment information is provided or processed. In some other embodiments, the pricing is adjusted (at 724 and 726) after the user payment information is provided or processed. For instance, POS device 703 may perform a reconciliation with the payment processor or bank to credit back the user for the difference between the original or retail pricing and the dynamic pricing for the same items.

Although the dynamic pricing is determining on an individual basis based on user data that is unique to each user and pricing rules that are unique to different items, DPOP 100 promotes the dynamic pricing by alerting the user mobile devices of the dynamic price availability or eligibility for different brands and/or retailers. For instance, DPOP 100 tracks a user location based on geolocation services of the user mobile device, determines when the user is in proximity to a retailer, determines whether pricing rules are defined for items sold by that retailer, and provides a notification that the user may receive discounted pricing by shopping at that retailer. Similarly, DPOP 100 may track the creation and/or updating of the pricing rules, determine when a new pricing rule is defined by a particular brand or a particular item, analyze the user profiles to identify users that have shown an interest or preference for the particular brand or the particular item, and send a notification to the mobile devices of the users that dynamic pricing is available for the particular brand or the particular item. In any case, DPOP 100 alerts users as to the dynamic price availability and/or promotions to incentive the users to engage with the brands and/or retailers.

Once engaged with a brand or retailer, the user engages with the individual items of that brand or retailer by scanning the items that are of interest to that user in order to obtain the dynamic pricing. Accordingly, the dynamic pricing produces a scavenger hunt scenario that encourages the users to engage with more items than they would if the user has a specific coupon that applied to a specific good or item.

Figure 8:
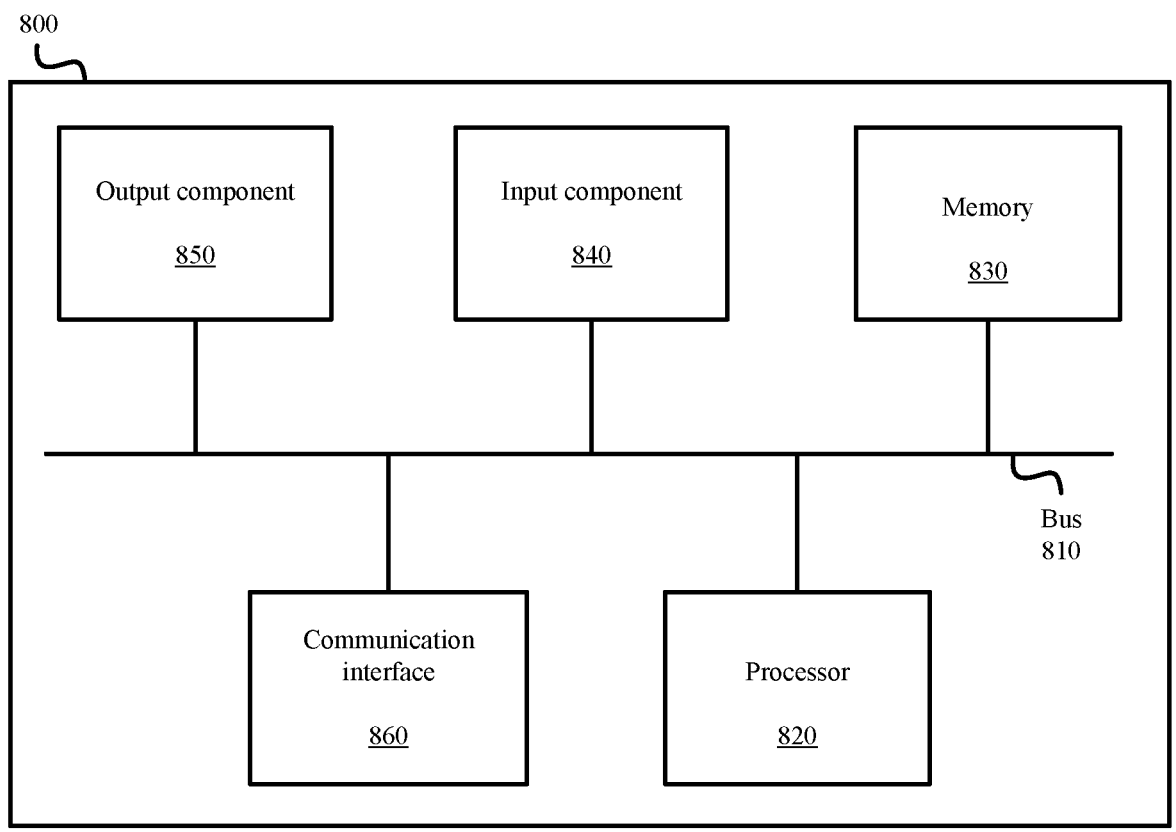
FIG. 8 illustrates example components of one or more devices, according to one or more embodiments described herein.

FIG. 8 is a diagram of example components of device 800. Device 800 may be used to implement one or more of the devices or systems described above (e.g., DPOP 100, mobile devices, POS devices, and/or components of architecture 300). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/of" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:

receiving, at a dynamic price orchestration platform ("DPOP"), a request comprising an item identifier with a device identifier from a user device in response to an activation of a scanner on the user device, wherein the item identifier identifies a particular item, and wherein the device identifier identifies the user device that issues the request;

obtaining, at the DPOP, a user profile that is associated with the device identifier, wherein the user profile comprises a plurality of data that is tracked from actions performed by the user device or a user associated with the user device;

selecting, by operation of the DPOP, a pricing rule that is defined for the item identifier, the pricing rule comprising executable code that dynamically sets a price for the particular item based on different weights attributed to a subset of data from the plurality of data in the user profile;

executing, by operation of the DPOP, the executable code of the pricing rule with the subset of data from the user profile provided as input, wherein executing the executable code comprises computing a dynamic price at which the particular item is offered to the user based on the different weights that are attributed to the subset of data according to the pricing rule;

modifying a display of the user device based on wireless messaging from the DPOP to the user device that causes the user device to present the dynamic price on the display;

generating, by operation of the DPOP, a block on a blockchain and a digital code that is encoded with a blockchain address of the block, wherein the block records the dynamic price, the item identifier, and the device identifier; and remotely controlling a point-of-sale ("POS") device with one or more messages from the DPOP, wherein remotely controlling the POS device comprises:
  accessing the block on the blockchain in response to receiving the blockchain address encoded in the digital code from the user device;
  retrieving the dynamic price, the item identifier, and the device identifier from the block; and
  adjusting an original price of the particular item to the dynamic price in response to verifying the device identifier from the block matches a first identifier of the user device that provides the digital code to the POS device and further in response to verifying that the item identifier from the block is an item that is scanned at the POS device.

2. The method of claim 1 further comprising:
providing the digital code to the user device, wherein the digital code comprises a machine-readable value that encodes the blockchain address.

3. The method of claim 2, wherein providing the digital code comprises:
entering the digital code to a digital wallet application of the user device with restrictions that prevent sharing of the digital code from the user device to another device.

4. The method of claim 1 further comprising:
generating an augmented reality view on the user device, the augmented reality view comprising a real-world image of the particular item or a tag of the particular item overlaid with the dynamic price.

5. The method of claim 1, wherein the device identifier is a first device identifier and the user device is a first device, the method further comprising:
  receiving a second request comprising the item identifier and a second device identifier of a second device that is different than the first device identified by the first device identifier;
  obtaining a second user profile that is associated with the second device identifier, wherein the second user profile comprises different data than the user profile that is associated with the first device identifier;
  generating a second dynamic price at which the particular item is offered to a user associated with the second device based on the pricing rule outputting a different price when input with a subset of the different data from the second user profile than with the subset of data from the user profile that is associated with the first device identifier; and
  adjusting the original price of the particular item at the POS device to the second dynamic price in response to the user associated with the second device initiating a purchase of the particular item.

6. The method of claim 1, wherein the item identifier is a first item identifier and the pricing rule is a first pricing rule, the method further comprising:
  receiving a second request comprising a second item identifier with the device identifier, wherein the second item identifier identifies a second item that is different than the particular item;
  selecting a second pricing rule that is defined for the second item identifier and that is different than the first pricing rule; and
  generating a second dynamic price at which the second item is offered to the user associated with the user device based on a second subset of the plurality of data from the user profile being provided as input to the second pricing rule.

7. The method of claim 1, wherein selecting the pricing rule comprises:
retrieving a smart contract from a plurality of smart contracts stored on the blockchain using the item identifier, wherein the smart contract comprises the executable code for evaluating different values defined for the subset of data in different user profiles to different dynamic pricing for the particular item.

8. The method of claim 7 further comprising:
  adding a first smart contract of the plurality of smart contracts to the blockchain based on a first pricing rule defined by a first brand for a first item; and
  adding a second smart contract of the plurality of smart contracts to the blockchain based on a second pricing rule defined by a different second brand for a second item.

9. The method of claim 7 further comprising:
  adding a first smart contract of the plurality of smart contracts to the blockchain based on a first pricing rule defined by a retailer for a first item offered for sale by the retailer; and
  adding a second smart contract of the plurality of smart contracts to the blockchain based on a second pricing rule defined by the retailer for a second item offered for sale by the retailer.

10. The method of claim 1, wherein executing the executable code of the pricing rule comprises:
  analyzing the pricing rule;
  determining the subset of data from the user profile used as inputs for computation of the dynamic price based on said analyzing;
  providing values defined for the subset of data in the user profile as inputs to the pricing rule; and
  computing the dynamic price by evaluating the values according to a mathematical formula and the different weights attributed to the subset of data in the pricing rule.

11. The method of claim 1 further comprising:
  detecting a change to the pricing rule;
  selectively targeting the user device for promotion of the particular item based on the plurality of data from the user profile comprising an interest or preference for the particular item or a brand associated with the particular item; and
  sending a notification to the user device of updated pricing for the particular item in response to detecting the change to the pricing rule and selectively targeting the user device for the promotion.

12. The method of claim 1 further comprising:
  tracking a location of the user device to be in proximity of a retailer;
  determining that the pricing rule is defined for the particular item and that the particular item is sold by the retailer; and
  generating a notification on the user device of the dynamic price associated with the particular item that is sold by the retailer in response to tracking the location of the user device to be in proximity of the retailer and determining that the pricing rule is defined for the particular item sold by the retailer.

13. A dynamic price orchestration platform comprising:
one or more hardware processors configured to:
receive a request comprising an item identifier with a device identifier from a user device in response to an activation of a scanner on the user device, wherein the item identifier identifies a particular item, and wherein the device identifier identifies the user device that issues the request;
obtain a user profile that is associated with the device identifier, wherein the user profile comprises a plurality of data that is tracked from actions performed by the user device or a user associated with the user device;
select a pricing rule that is defined for the item identifier, the pricing rule comprising executable code that dynamically sets a price for the particular item based on different weights attributed to a subset of data from the plurality of data in the user profile;
execute the executable code of the pricing rule with the subset of data from the user profile provided as input, wherein executing the executable code comprises computing a dynamic price at which the particular item is offered to the user based on the different weights that are attributed to the subset of data according to the pricing rule;
modify a display of the user device based on wireless messaging issued to the user device that causes the user device to present the dynamic price on the display;
generate a block on a blockchain and a digital code that is encoded with a blockchain address of the block, wherein the block records the dynamic price, the item identifier, and the device identifier; and
remotely control a point-of-sale ("POS") device, wherein remotely controlling the POS device comprises:
accessing the block on the blockchain in response to receiving the blockchain address encoded in the digital code from the user device;
retrieving the dynamic price, the item identifier, and the device identifier from the block; and
adjusting an original price of the particular item to the dynamic price in response to verifying the device identifier from the block matches a first identifier of the user device that provides the digital code to the POS device and further in response to verifying that the item identifier decoded from the block is an item that is scanned at the POS device.

14. The dynamic price orchestration platform of claim 13, wherein the one or more hardware processors are further configured to:
provide the digital code to the user device, wherein the digital code comprises a machine-readable value that encodes the blockchain address.

15. A non-transitory computer-readable medium storing program instructions that, when executed by one or more hardware processors of a dynamic price orchestration platform, cause the dynamic price orchestration platform to perform operations comprising:
receiving a request comprising an item identifier with a device identifier from a user device in response to an activation of a scanner on the user device, wherein the item identifier identifies a particular item, and wherein the device identifier identifies the user device that issues the request;
obtaining a user profile that is associated with the device identifier, wherein the user profile comprises a plurality of data that is tracked from actions performed by the user device or a user associated with the user device;
selecting a pricing rule that is defined for the item identifier, the pricing rule comprising executable code that dynamically sets a price for the particular item based on different weights attributed to a subset of data from the plurality of data in the user profile;
executing the executable code of the pricing rule with the subset of the data from the user profile being provided as input to the pricing rule;
modifying a display of the user device based on wireless messaging issued to the user device that causes the user device to present the dynamic price on the display;
generating a block on a blockchain and a digital code that is encoded with a blockchain address of the block, wherein the block records the dynamic price, the item identifier, and the device identifier; and
remotely controlling a point-of-sale ("POS") device, wherein remotely controlling the POS device comprises:
accessing the block on the blockchain in response to receiving the blockchain address encoded in the digital code from the user device;
retrieving the dynamic price, the item identifier, and the device identifier from the block; and
adjusting an original price of the particular item to the dynamic price in response to verifying the device identifier from the block matches a first identifier of the user device that provides the digital code to the POS device and further in response to verifying that the item identifier from the block is an item that is scanned at the POS device.

* * * * *